United States Patent [19]

Nishimura

[11] Patent Number: 5,050,215
[45] Date of Patent: Sep. 17, 1991

[54] SPEECH RECOGNITION METHOD

[75] Inventor: Masafumi Nishimura, Kanagawa, Japan

[73] Assignee: International Business Machines Corporation, Armonk, N.Y.

[21] Appl. No.: 524,689

[22] Filed: May 10, 1990

Related U.S. Application Data

[63] Continuation of Ser. No. 256,886, Oct. 12, 1988, abandoned.

[30] Foreign Application Priority Data

Oct. 12, 1987 [JP] Japan ............................... 62-254821

[51] Int. Cl.$^5$ .......................... G10L 5/00; G10L 5/04; G10L 5/06
[52] U.S. Cl. ........................................ 381/41; 381/43
[58] Field of Search ................... 381/41–45; 364/513.5

[56] References Cited

U.S. PATENT DOCUMENTS

| 4,718,094 | 1/1988 | Bahl et al. | 381/43 |
| 4,741,036 | 4/1988 | Bahl et al. | 381/43 |
| 4,748,670 | 5/1988 | Bahl et al. | 381/43 |
| 4,759,068 | 7/1988 | Bahl et al. | 381/43 |
| 4,817,156 | 3/1989 | Bahl et al. | 381/43 |
| 4,827,521 | 5/1989 | Bahl et al. | 364/513.5 |
| 4,829,577 | 5/1989 | Kuroda et al. | 381/45 |

FOREIGN PATENT DOCUMENTS

| 61-016993 | 3/1986 | Japan . | |
| 61-065030 | 6/1986 | Japan . | |
| 2188181 | 9/1987 | United Kingdom | 381/45 |

OTHER PUBLICATIONS

Niitsu et al., "A Method of Using Linguistic Information for Automatic Spoken Word Recognition", Systems-Computers-Controls, vol. 10, Jan.–Feb. 1979, pp. 17–26.
Rabiner et al., "Speaker-Independent Recognition of Isolated Words Using Clustering Techniques", IEEE Trans on ASSP, vol. ASSP-27, No. 4, Aug. 1979, pp. 336–349.
Schwartz, R. et al., "Rapid Speaker . . . ", Proc. ICASSP, 15–3, Mar. 1987, pp. 633–636.
Shikano, K., "Speaker . . . ", Trans. IECE Japan, SP86-65, Dec. 1986, pp. 33–40.
Sugawara, K. et al., "Isolated Word . . . ", Proc. ICASSP, 1-1, Mar. 1985, pp. 1–4.
Sugawara, K. et al., "Speaker . . . ", Proc. ICASSP, 49–11, Apr. 1986, pp. 2267–2270.
Bahl, L. R. et al., "A Maximum . . . ", IEEE Trans. on Pattern Analysis and Mach. Intell., vol. PAMI-5, No. 2, Mar. 1983, pp. 179–190.
Jelinek, F., "Continuous . . . ", Proc. IEEE, vol. 64, No. 4, Apr. 1976, pp. 532–556.
Levinson, S. E. et al., "An Introduction . . . ", Bell Sys. Tech. J., vol. 62, No. 4, Apr. 1983, pp. 1035–1074.
Nishimura et al., "Speaker Adaptation Method for HMM-Based Speech Recognition", 1988 Int'l. Conf. on Acoustics, Speech, and Signal Processing, New York, pp. 207–210.

Primary Examiner—Emanuel S. Kemeny
Assistant Examiner—David D. Knepper
Attorney, Agent, or Firm—Marc D. Schechter

[57] ABSTRACT

For circumstance adaption, for example, speaker adaption, confusion coefficients between the labels of the label alphabet for initial training and those for adaption are determined by alignment of adaption speech with the corresponding initially trained Markov model. That is, each piece of adaptation speech is aligned with a corresponding initially trained Markov model by the Viterbi algorithm, and each label in the adaption speech is mapped onto one of the states of the Markov models. In respect of each adaptation lable ID, the parameter values for each initial training label of the states which are mapped onto the adaptation label in concern are accumulated and normalized to generate a confusion coefficient between each initial training label and each adaptation label. The parameter table of each Markov model is rewritten in respect of the adaptation label alphabet using the confusion coefficients.

11 Claims, 8 Drawing Sheets

SPEECH RECOGNITION METHOD

This is a continuation of application Ser. No. 256,886, filed Oct. 12, 1988, now abandoned.

BACKGROUND OF THE INVENTION

The present invention relates to a speech recognition method using Markov models and more particularly to a speech recognition method wherein speaker adaptation and circumstantial noise adaptation can be easily performed.

In speech recognition using Markov models, speech is recognized from probabilistic viewpoints. In one method, for example, a Markov model is established for each word. Usually a plurality of states and transitions between the states are defined for each Markov model, and occurrence probabilities are assigned for each state transition, and further output probabilities of labels or symbols are assigned for each state or state transition. An inputted unknown speech is converted into a label string, and thereafter a probability of each word Markov model outputting the label string is determined based on the transition occurrence probabilities and the label output probabilities which are hereafter referred to parameters. Then the word Markov model having the highest probability of producing the label string is determined. The recognition is performed according to this result. In speech recognition using Markov models, the parameters can be estimated statistically so that a recognition score is improved.

The details of the above recognition technique are described in the following articles.

(1) "A Maximum Likelihood Approach to Continuous Speech Recognition" by Lalit R. Bahl, Frederick Jelinek and Robert L. Mercer (*IEEE Transaction on Pattern Analysis and Machine Intelligence*, Vol. PAMI-5, No. 2, pp. 179-190, 1983).

(2) "Continuous Speech Recognition by Statistical Methods" by Frederick Jelinek (*Proceedings of the IEEE* Vol. 64, No. 4, 1976, pp. 532-556).

(3) "An Introduction to the Application of the Theory of Probabilistic Functions of a Markov Process to Automatic Speech Recognition" by S. E. Levinson, L. R. Rabiner and M. M. Sondi (*The Bell System Technical Journal*, Vol. 64, No. 4, April 1983, pages 1035-1074).

Speech recognition using Markov models however needs a tremendous amount of speech data and the training thereof requires much time. Furthermore a system trained with a certain speaker often does not get sufficient recognition scores for other speakers. Moreover, even with the same speaker, when there is a long time between the training and the recognition (that is, when there is a difference between the two circumstances), only poor recognition can be achieved. In addition, degradation of recognition accuracy due to circumstantial noise is another issue.

Recently adaptation of trained Markov models for a speaker or a circumstance is often proposed. These proposals are considered to be classified into the following two types.

In the first type of proposal, event frequencies used for estimating parameters of Markov models during initial training are reserved, and further event frequencies are obtained for adaptation data. Thereafter these event frequencies are interpolated to estimate new parameters. Such proposals are described in:

(4) "Speaker Adaptation for A Hidden Markov Model", by Kazuhide Sugawara, Masafumi Nishimura and Akihiro Kuroda (*Proceedings of ICASSP '86*, April 1986, 49-11, pp. 2667-2670).

(5) Japanese Patent Application No. 61-65030 (corresponding to U.S. patent application Ser. No. 025,257, filed Mar. 12, 1987, and European Patent Application 243,009).

These proposals however require utterance of all the subject words for adaptation, and consequently impose a burden on users in large vocabulary speech recognition. Further they require much more tremendous computation time.

In the second type of proposal, Markov models produced by initial training are modified according to relations between parameters. These proposals are described in:

(6) "Isolated Word Recognition Using Hidden Markov Models", by Kazuhide Sugawara, Masafumi Nishimura, Kouichi Toshioka, Masaaki Okochi and Toyohisa Kaneko (*Proceeding of ICASSP '85*, March 1985, 1-1, pp. 1-4).

(7) "Rapid Speaker Adaptation Using A Probabilistic Spectral Mapping" by Richard Schwartz, Yen-Lu Chow, Francis Kubala (*Proceedings of ICASSP '87*, March 1987, 15-3, pp. 633-636).

In the technique described in the article (6), dynamic programming (DP) matching is performed among labeled words and a confusion matrix of labels is produced according to relations between labels in respect of an optimum path. Then parameters of Markov models are modified using that confusion matrix. In this approach, DP-matching is required in addition to Markov models, so that storage efficiency is not good. Further, tremendous speech data is required for a confusion matrix having an enough accuracy.

The technique described in the article (7) directly introduces relation probabilities between labels into output probabilities of conventional Markov models. This approach requires forward/backward calculation and, as a result, tremendous computational cost and storage cost.

The following article described adaptation of features for vector quantization.

(8) "Speaker Adaptation Through Vector Quantization", by Kiyohiro Shikano (*Transactions of the Institute of Electronics and Communication Engineers of Japan*, December 1986, SP86-65, pp. 33-40).

SUMMARY OF THE INVENTION

As a consequence of the foregoing difficulties in the prior art, it is an object of the present invention to provide a speech recognition method wherein a trained system can be adapted for different circumstances and the adaptation can be done more easily.

According to the present invention, adaptation speech is first labeled. Next, each label string is connected with the corresponding Markov model in a time sequence. Each of the Markov models have been in advance estimated with a lot of speech data. Based on the connection therebetween, the frequency of connection between each label and each state transition is counted. From the resultant counts, conditional probabilities between labels and state transitions are estimated. Using these conditional probabilities, parameters of Markov models which were obtained in advance are updated into new parameters. In this connection, before labelling adaptation speech, label prototypes may be modified using the adaptation speech to minimize quantization error.

Figure 1:
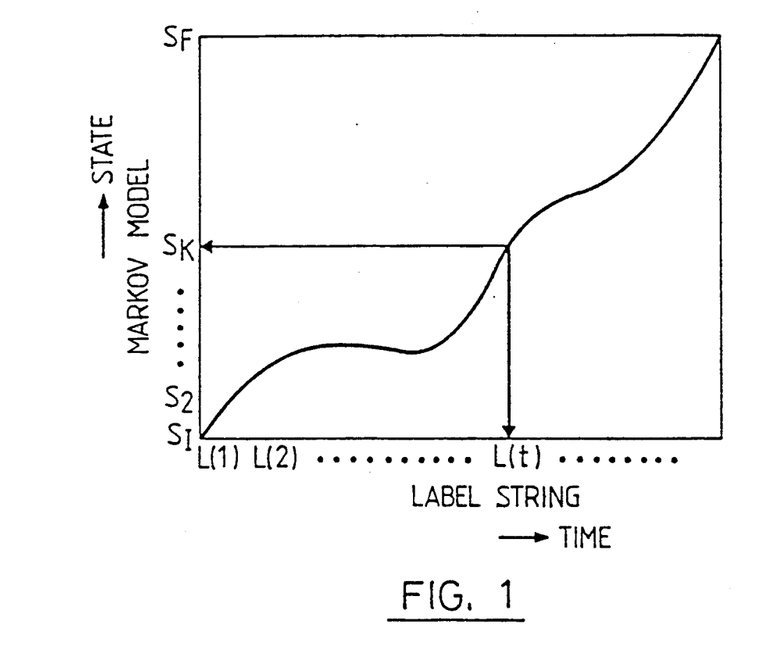
FIG. 1 shows the relationship between speech labels and the states of a Markov model.

Let's consider, for example, connection between a Markov model and a label string of adaptation speech as shown in FIG. 1. In FIG. 1, the abscissa axis indicates a label string of adaptation speech, and the ordinate axis indicates states of a Markov model. An inputted label is shown by L(t). "t" indicates time. As shown in FIG. 1, the function V determines the relation between the label string and the states of the model. The state Sk of the Markov model is then obtained by $$Sk = V(L(t)).$$

The frequency, C, of connection (confusion) between the labels Li and Lj are obtained from the output probabilities P(Li|Sk) of the labels at the states Sk. Here Li is a label identifier for initial training and Lj below is one for adaptation.

$$C(Lj,Li) = \sum_{L(t)=Lj} P(Li|V(L(t)))$$

The probability of the label Lj being connected with the label Li is obtained by normalizing the frequency C for each Li as expressed below.

$$P(Lj|Li) = C(Lj,Li) / \sum_{Lj} C(Lj,Li)$$

An output probability P(Li|Sk) of a Markov model established beforehand is updated by the following expression with the above probability P(Lj|Li) to produce parameters on which the adaptation data accurately reflects.

$$P(Lj|Sk) = \sum_{Li} P(Li|Sk)P(Lj|Li)$$

For transition probabilities, likewise, frequencies of connection between state transitions are counted by using the transition probability at each state, P(Ti|Sk), along the state transition path specified by the relation between the label string of adaptation speech and states of the Markov model. The probability P(Tj|Ti) is obtained by normalizing the frequency. Transition probabilities established beforehand are transformed by the following expression with the above probabilities P(Tj|Ti), and then used for speech recognition.

$$P(Tj|Sk) = \sum_{Ti} P(Ti|Sk)P(Tj|Ti)$$

In the above, the explanation is made for the case in which a Markov model has label output probabilities and state transition probabilities as probabilistic parameters separately. The present invention can be applied to the case in which each state has label output probabilities.

Further adaptation in respect with only label prototypes or only parameters of Makov models is possible.

In the above example, as suggested by FIG. 1, labels L(t) are connected with states Sk by using the path along which the label string is most favorably aligned with the Markov model. For this purpose Viterbi algorithm for speech recognition can be used without any modification. The connection is not however limited to the above, and can be modified. For example, a label string can be related with states linearly.

DESCRIPTION OF THE PREFERRED EMBODIMENTS

Now, referring to the drawings, the present invention will be explained below with respect to an embodiment thereof which is applied to a word recognition system.

Figure 2:
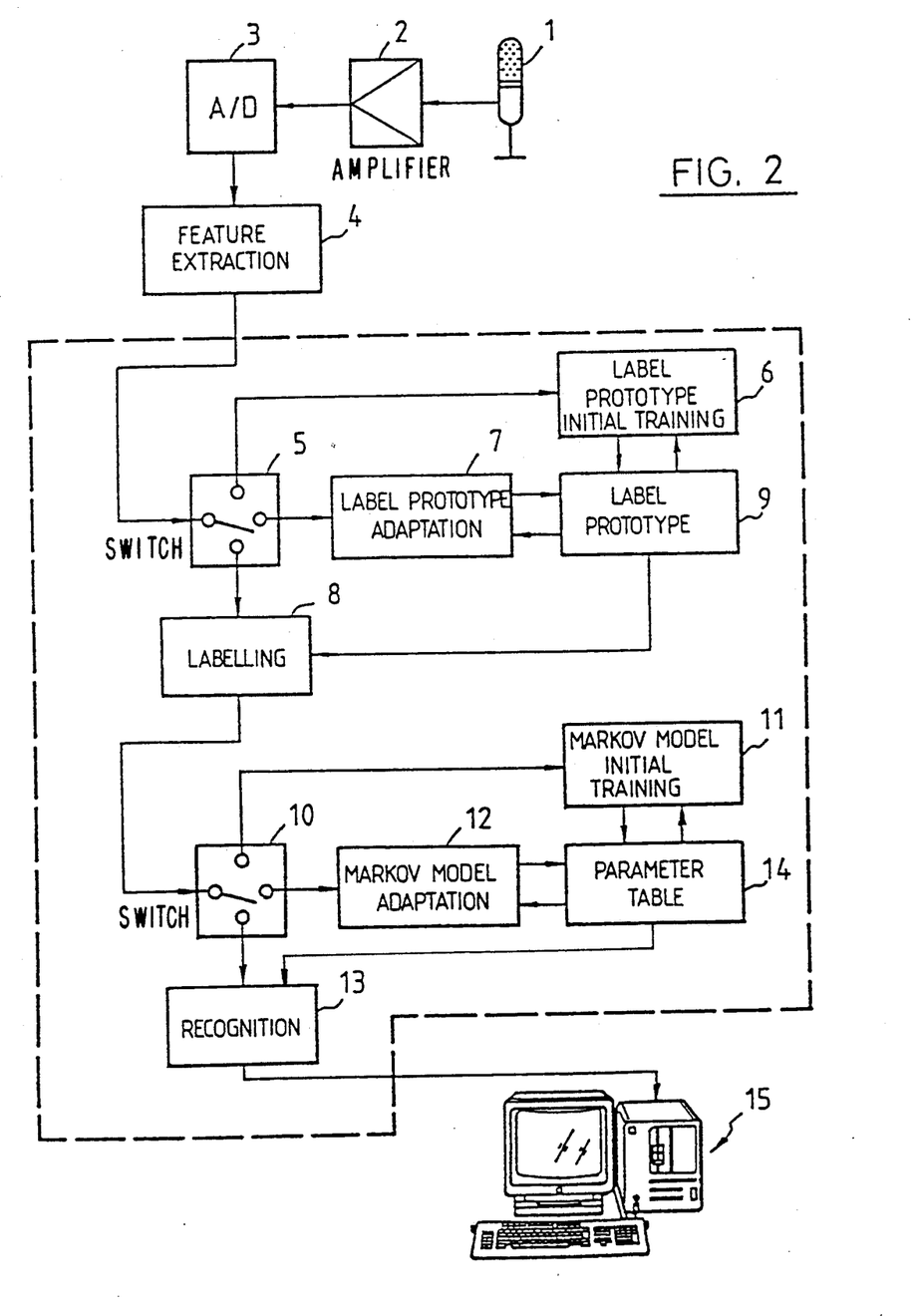
FIG. 2 is a block diagram illustrating one embodiment of the invention.

In FIG. 2 illustrating the embodiment as a whole, inputted speech data is supplied to an analog/digital (A/D) converter 3 through a microphone 1 and an amplifier 2 to be converted into digital data, which is then supplied to a feature extracting block 4. In the feature extracting block 4, speech data is at first descrete-Fourier-transformed and is then outputted at each channel of a 20 channel critical band pass filter on which acoustical sense features reflect. The output is provided to the next stage, or a switching block 5 via a window of 25.6 milliseconds for every 8 milliseconds, and is subsequently supplied to either of a label prototype initial training block 6, a label prototype adaptation block 7 and a labelling block 8.

During initial training of label prototypes, the switching block 5 is switched to the label prototype training block 6 and supplies the output of the critical band pass filter to that training block 6. The training block 6 produces a dictionary consisting of 128 label prototypes by clustering.

During adaptation of label prototypes, the switching block 5 is switched to the adaptation block 7 which thus adapts the prototype dictionary 9 produced by the initial training label prototypes. The detail of the adaptation block is described later referring to FIG. 3. During recognition, initial training of Markov models or adaptation of them, the switching block 5 is switched to the labelling block 8 which then performs labelling by consulting the label prototype dictionary 9. Label prototypes produced by initial training are used without any change for initial training of Markov models.

Figure 3:
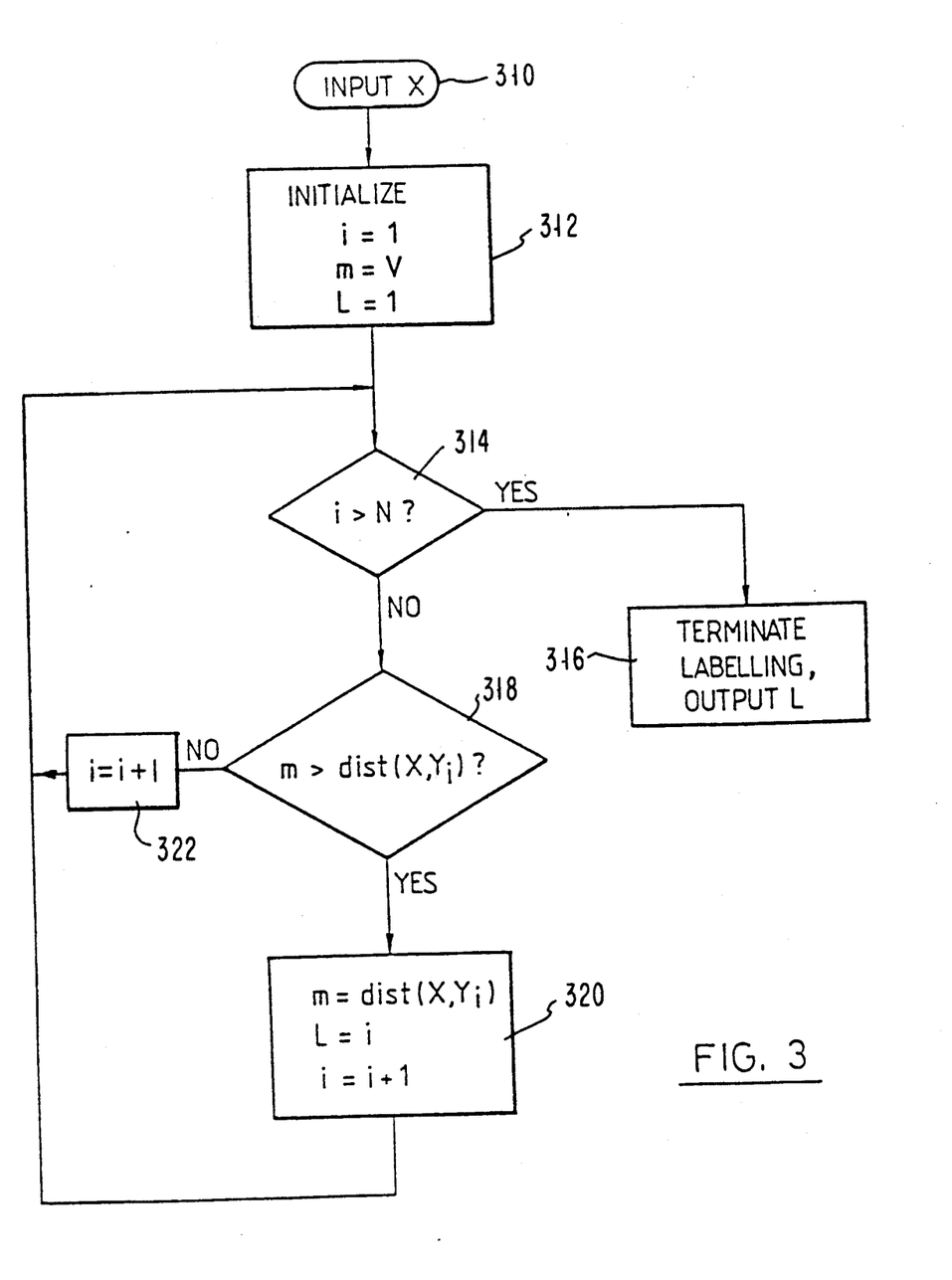
FIG. 3 is a flow chart describing the operation of the labeling block 8 of the example shown in FIG. 2.

The labelling is for example performed as shown in FIG. 3, in which X is the inputted feature, Yi is the feature of the i-th prototype, N is the number of prototypes (e.g. N=128), dist(X, Yi) is the Euclid distance between X and Yi, and m is the minimum value among previous dist(X,Yi)'s. m is initialized to a very large number. As shown in steps 310 to 322 FIG. 3, inputted features X's are in turn compared with each feature prototype, and for each inputted feature the most like prototype, that is, the prototype having the shortest distance is outputted as an observed label or label number L.

As described above, the labelling block 8 outputs a label string with duration of eight milliseconds between consecutive labels.

In FIG. 2 label strings from the labelling block 8 are provided to one of a Markov model initial training block 11, a Markov model adaptation block 12 and a recognition block 13 through a switching block 10. The detailed description about the operation of the initial training block 11 and the adaptation block 12 will be given later referring to FIG. 5 and the following figures. During Markov model initial training the switching block 10 is switched to the training block 11 to provide the label string thereto. The training block 11 determines parameter values of a parameter table 14 by training Markov models using the label strings. During adaptation the switching block 10 is switched to the adaptation block 12, which adapts the parameter values of the parameter table 14 based on the relation between inputted label strings and the states of Markov models. During recognition the switching block 10 is switched to the recognition block 13, which recognizes an inputted speech based on the label strings and the parameter table. The recognition block 13 can be designed according to Forward-Backward algorithm or Viterbi algorithms.

The output of the recognition block 13 is provided to a workstation 15 and is for example displayed on its monitor screen.

Figure 4:
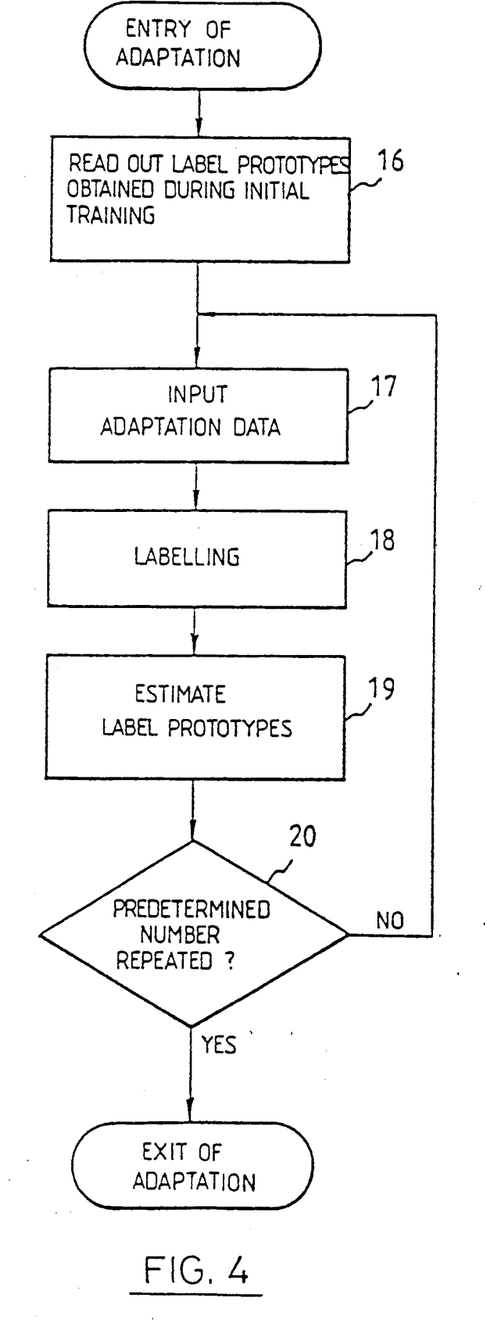
FIG. 4 is a flow chart describing the label prototype adaptation block 7 of the example shown in FIG. 2.

The detail of label prototype adaptation block 7 will be next described. FIG. 4 illustrates the procedure of that adaptation, in which a label prototype dictionary obtained during the initial training is first read out (step 16). Adaptation speech is then inputted (step 17). The adaptation speech was obtained from a speaker who intends to input speech to the system and can be of any type such as moras, sentences, words or the like. For example when a part of recognition target vocabulary is spoken for this purpose, the speech can also be used for the Markov model adaptation block 12. The adaptation speech is labelled by using the label prototypes (step 18). After all the pieces of the adaptation speech are labelled, for each label number, feature vectors of the adaptation speech, having that label number are averaged and the label prototype of that number is replaced with an average feature vector (step 19). The procedure mentioned above (steps 17 to 19) is repeated a predetermined number of times, for example twice, and then the adaptation of the prototypes is completed.

In FIG. 2 the blocks surrounded by the broken line are in fact implemented in software on a host computer. An IBM 3083 processor is used as the host computer. CMS and PL/I are used as an operating system and a language, respectively. The above blocks can alternatively be implemented in hardware.

Figure 5:
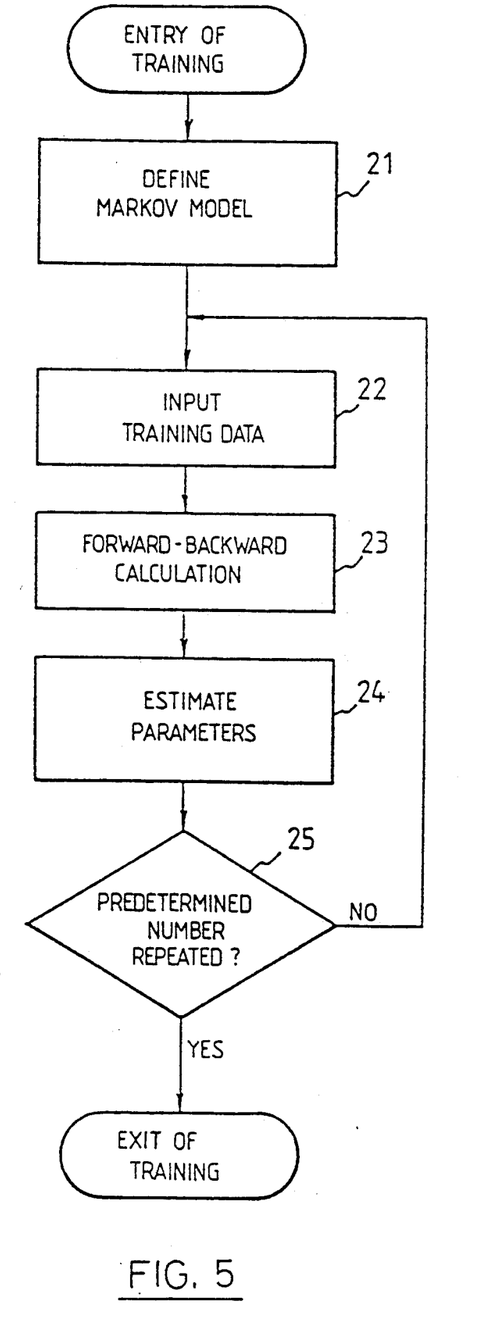
FIG. 5 is a flow chart describing the operation of the Markov model initial training block 11 of the example shown in FIG. 2.
Figure 6:
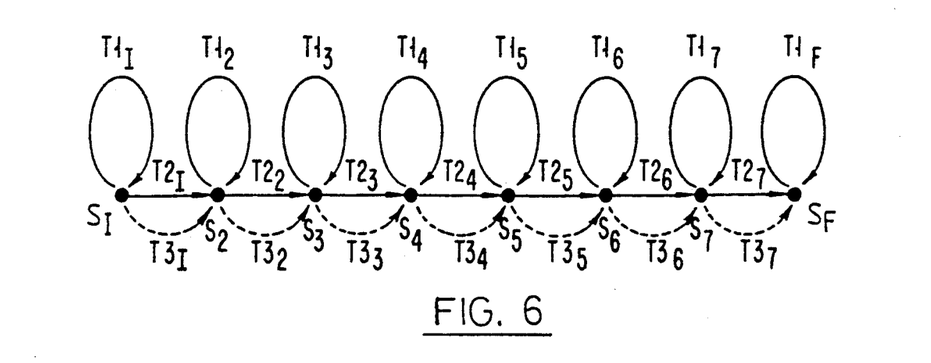
FIG. 6 is an example of a word Markov model.

The operation of the Markov model initial training block 11 will be next described referring to FIG. 5 and the following figures. In FIG. 5 showing the procedure of the initial training, each word Markov model is first defined (step 21). FIG. 6 shows an example of a word Markov model, in which small solid circles indicate states, and arrows show transitions. The number of the states including the initial state SI and the final state SF is 8. There are three types of transitions, that is, transitions T1 to themselves, transitions T2 to the next states, and null transitions T3 to the next states without outputting any label.

Figure 7:
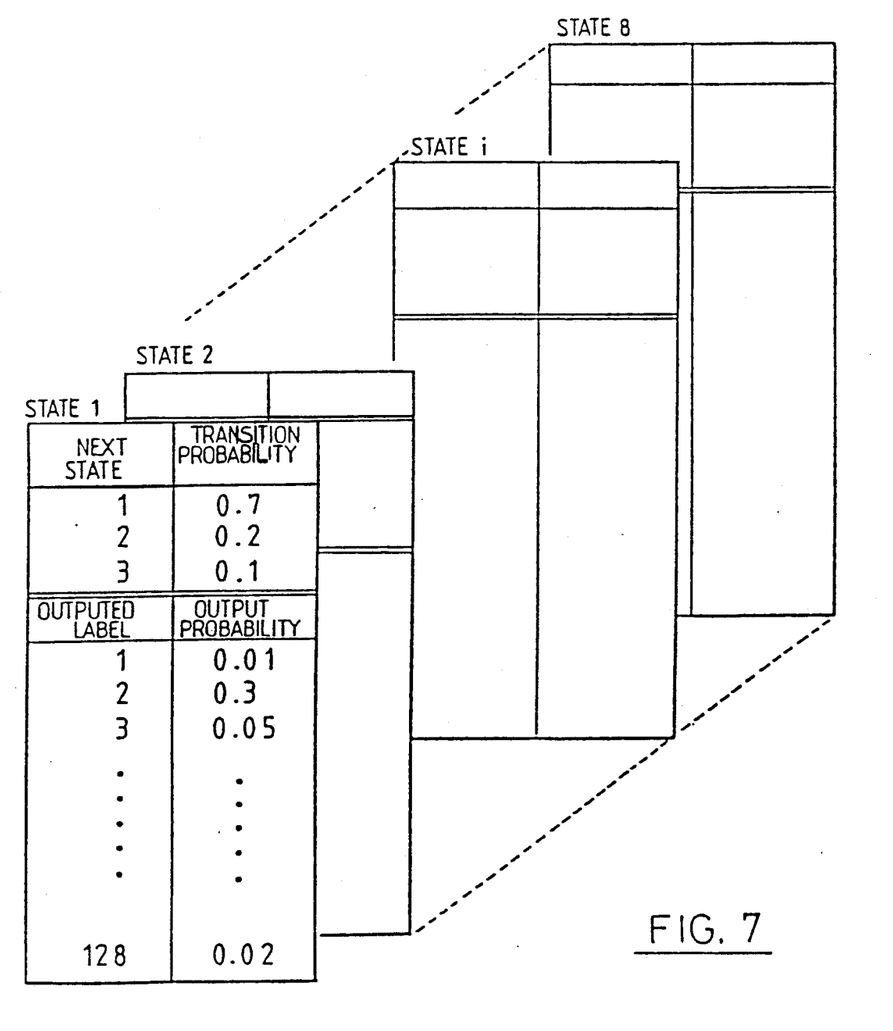
FIG. 7 is an example of a parameter table of a Markov model.

To define the Markov models means to tentatively establish the parameter table 11 of FIG. 2. In particular, for each word a table format as shown in FIG. 7 is assigned and the parameters P(Li|Sk) and P(Ti|Sk) are initialized. The parameter P(Li|Sk) means a probability of outputting a label Li in a state Sk, and P(Ti|Sk) means a probability of making a transition Ti in a state Sk. Furthermore in this initialization, the parameters are set so that transitions T1, T2 and T3 occur at probabilities of 0.9, 0.05 and 0.05, respectively, and so that on each transition all labels are produced at equal probability that is 1/128. In FIG. 7 trained probabilities are shown.

After defining word Markov models, initial training data is inputted (step 22), which are label strings obtained by speaking words to be recognized ten times. Initial training label prototypes are used to identify the label strings. After inputting initial training data, Forward-Backward calculation is performed (step 23). This calculation is performed for all initial training data for each word to be recognized, and the parameters of the Markov model of each word are estimated (step 24). The above process (steps 22 to 24) is iterated a predetermined number of times, for example five times, with newly established parameters for each iteration. Thereafter the initial training is completed.

Figure 8:
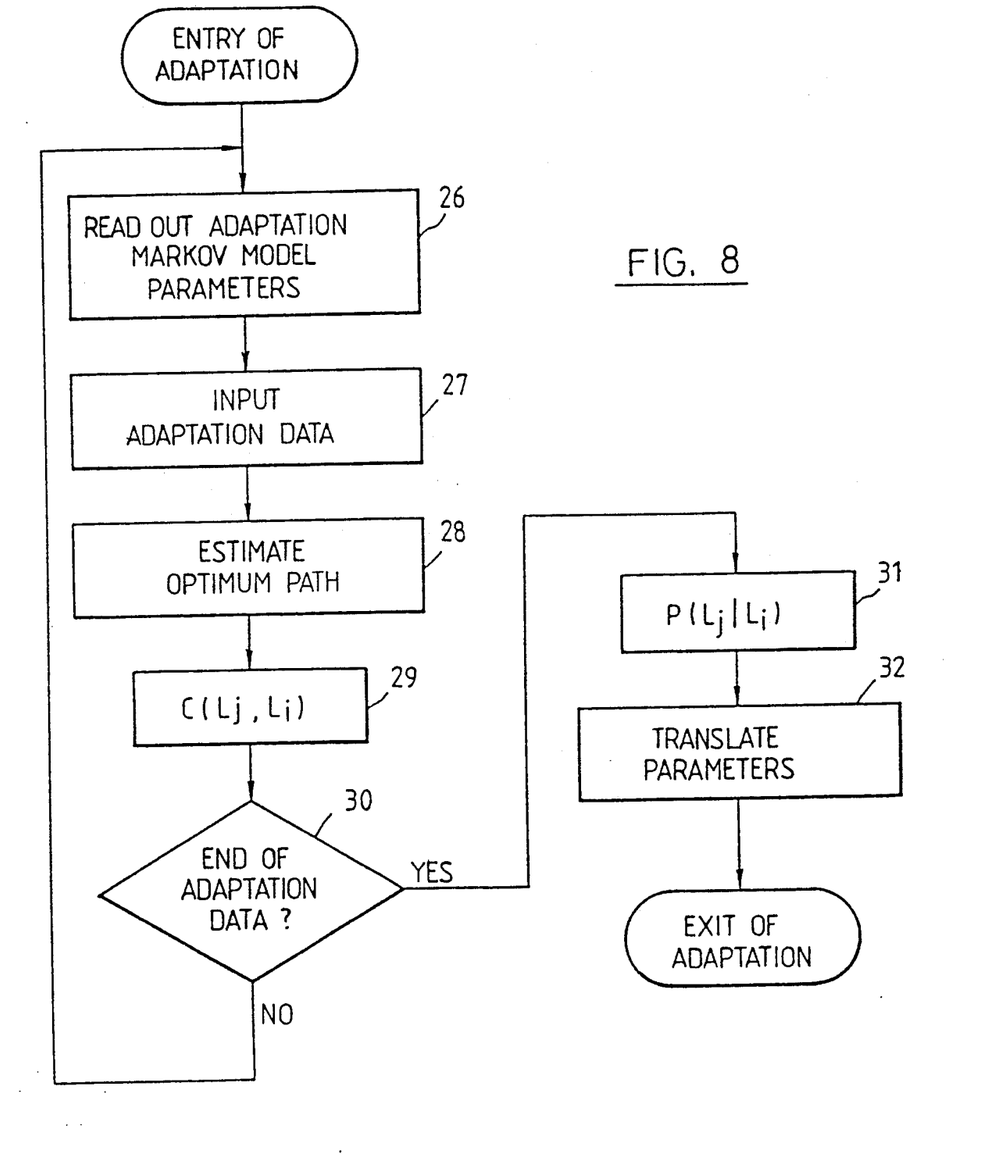
FIG. 8 is a diagram for describing the operation of the Markov model adaptation block 12 of the example shown in FIG. 2.
Figure 9:
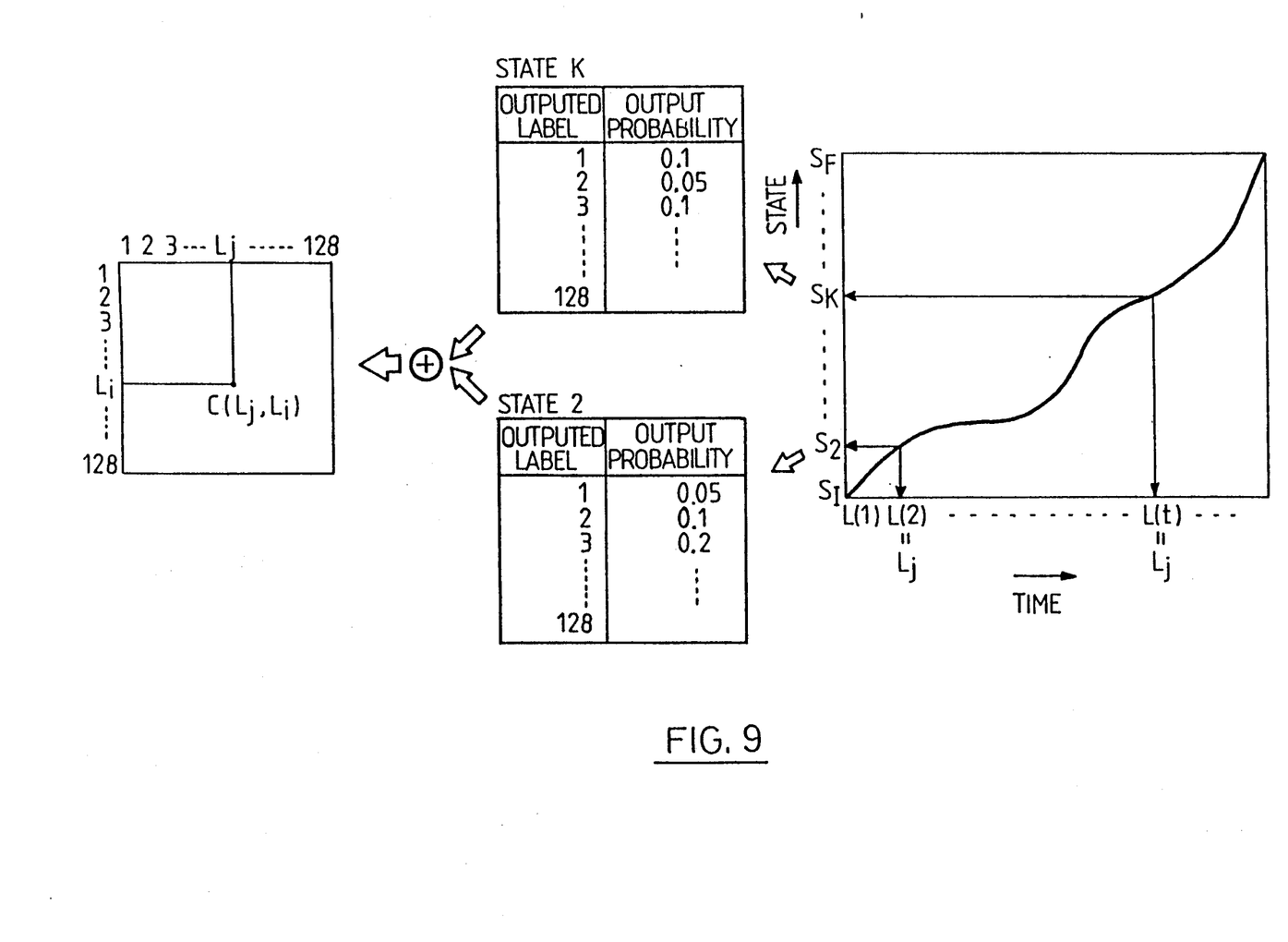
FIG. 9 is a flow chart describing the operation shown in FIG. 8.

Next the operation of the Markov model adaptation block 12 is described referring to FIG. 8 and FIG. 9. Thereafter an example is considered wherein some of the target words are used for adaptation of output probabilities of Markov models.

In FIG. 8, at first, the parameters of the Markov model for one of the words used for the adaptation are read in (step 26). They are ones obtained in the initial training above. Next the speech of the adaptation word is inputted (step 27). This speech for the adaptation is spoken by the speaker who wants to speak and input. The adaptation speech is labeled using the label prototypes adapted by the adaptation block 7. Then the label string of the adaptation speech and the states of the word Markov model are connected with each other along the most likely path by the Viterbi algorithm (step 28). Let V be the relation between the labels and the states of the Markov model along the most favorable path determined by the Viterbi algorithm. That is then expressed by the following equation.

$$Sk = V(L(w,t))$$

where
Sk is a state number
L(w,t) is a label number for a word number w and time number t.

Along the path, probabilities of a label Li being connected (confused) with Lj are counted and summed (step 29).

$$C(Li,Lj) = \sum_{L(w,t)=Lj} P(Li | V(L(w,t)))$$

FIG. 9 shows the above operation pictorially.

The above process (steps 26 to 29) is performed for each piece of speech for the adaptation. C(Lj, Li) obtained is normalized for each Li and then P(Lj|Li) (the probability of confusing Lj with Li) is determined (step 31).

$$P(Lj|Li) = C(Lj,Li) / \sum_{Lj} C(Lj,Li)$$

Finally all output probabilities of the Markov models, which have been obtained in the initial training, are transformed using P(Lj|Li) (step 32).

$$P(Lj|Sk) = \sum_{Li} P(Li|Sk)P(Lj|Li)$$

In the above the example of output probabilities are explained, and likewise transition probabilities are processed.

After performing the steps mentioned above, the adaptation is completed. After that, speech of the speaker for whom the adaptation was performed can be recognized at a high accuracy.

According to this embodiment the system can be adapted for different circumstances only using a small amount of adaptation data such as a part of recognition target words and very rapidly. In particular, the present invention can be applied to cases with large vocabularies of more than one thousand recognition target words. Where in the past training required several repetitions of each word for each individual speaker or each different circumstance (imposing a heavy load on the speaker and requiring a tremendous amount of computational cost), the load on the speaker are remarkably reduced and the efficiency becomes excellent. This is because according to the present invention the initial training data obtained for one speaker can be used for others. Furthermore since only P(Lj|Li) and P(Tj|Ti) are required as tables for adaptation for speakers or circumstances, there are required very little of memory capacity and computational capacity for the new process.

An experiment was made for evaluating of the embodiment where one hundred and fifty words which are similar to each other such as "keiho" (in Japanese, alarm), "heiho" (square); "tyokusen" (straight line), "tyokuzen" (immediately before) were used as recognition target words. In this experiment, each of the 150 words was spoken 10 times by one male speaker for initial training data for label prototypes and Markov models. For adaptation, seven speakers, five males and two females, were evaluated. The adaptation was performed using a partial vocabulary (10, 25, 50, 100, and 150 words), at one repetition for each word. Three repetitions for each speaker for each of the 150 words were experimentally recognized.

Figure 10:
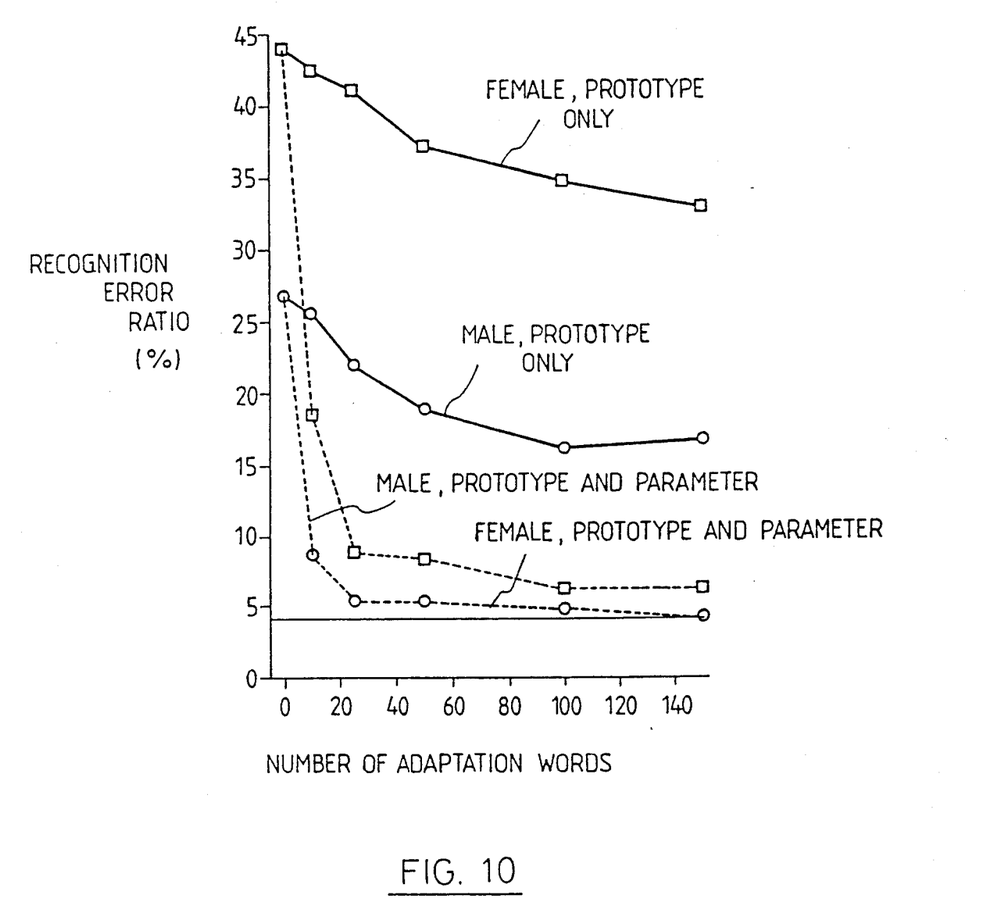
FIG. 10 is a diagram for showing the result of an experiment based on the present invention.

FIG. 10 shows the result of the experiment. In FIG. 10, the abscissa axis indicates the number of adaptation words and the ordinate axis indicates an average error rate. The circles indicate male speaker data and the squares indicate female speaker data. The solid lines indicate adaptation of prototypes only, and the dashed lines indicate adaptation of parameters of Markov models as well. Further the solid line of 4% is the experimental result of recognition for the speaker who trained initially. From that result, it is understood that recognition rates for male speakers can be improved as equivalent to the speaker who initially trained the system by adaptation with 25 words of speech. Furthermore the adaptation for female speakers which was in the past considered difficult, can be achieved sufficiently.

The scope of the present invention is not limited to the above embodiment, and different changes can be made without departing from that scope. For example, this invention can be applied to the adaptation in feneme type HMM speech recognition described in Japanese Patent Application No. 61-16993 (corresponding to U.S. patent application Ser. No. 697,174, filed Feb. 1, 1985, and European Patent Application 238,693). In this adaptation, the label strings of adaptation speech and the strings of feneme Markov models (each string forming a word Markov model) are aligned to map the labels of the adaptation speech onto the states of the word Markov models.

As described above, according to the present invention adaptation of a speech recognition system can be done with small data and short time. The required memory capacity and computational capacity are very small.

I claim:

1. In a speech recognition method wherein Markov models trained by an initial training label set and initial training speech are adapted using adaptation speech, an improvement comprising:
   interpreting said adaptation speech into adaptation label strings using an adaptation label set different from said initial training label set;
   connecting each label in each of said adaptation label strings with each state or each state transition of a Markov model which corresponds to the adaptation label strings concerned;
   determining a confusion probability of each label in said initial training label set and each label in said adaptation label set being confused with each other, based on connection between each label in said adaptation label set and each of said states or state transitions, and parameter values of the Markov model concerned in respect of said initial training set; and
   determining parameter values of each of said Markov models in respect of said adaptation label set, based on said confusion probabilities and said parameter values of the Markov model concerned in respect of said initial label set.

2. A speech recognition method as described in claim 1, wherein a prototype of each label in said initial training label set is modified using said adaptation speech to generate a prototype of each label in said adaptation label set.

3. A speech recognition method as described in claim 2, wherein feature vectors extracted from said adaptation speech are classified into classes according to label prototypes of said initial training label set, and an average of each of said classes is used as a corresponding prototype of said adaptation label set.

4. A speech recognition method as described in claim 3 wherein said connection between each of said label and each of said states or state transitions is established by a path by which each of said adaptation label strings is linearly aligned with a Markov model corresponding to the adaptation label string concerned.

5. A speech recognition method comprising the steps of:
   providing a set of Markov models, each Markov model corresponding to an element of speech information, each Markov model having states, a set of initial labels, and transitions between states, each label having an initial conditional probability for each state or transition;

converting an element of adaptation speech information into a string of adaptation labels using an adaptation label set different from the initial label set;

identifying a corresponding Markov model from the set of Markov models which corresponds to the string of adaptation labels;

estimating for the corresponding Markov model an optimum string of states and transitions corresponding to the string of adaptation labels;

calculating for each adaptation label Lj the probabilities P(Lj|Li) of confusing the adaptation label Lj with each initial label Li, said probabilities being calculated based on the initial conditional probabilities of the initial labels Li for each of the states or transitions corresponding to the adaptation label Lj;

calculating for each adaptation label Lj a revised conditional probability P(Lj|Sk) of occurrence of the adaptation label Lj for a first state or transition Sk based on the confusion probabilities P(Lj|Li) and based on the initial conditional probabilities P(Li|Sk) of the initial labels Li for the first state or transition; and updating the corresponding Markov model by replacing the initial conditional probabilities of the initial labels with the revised conditional probabilities of the adaptation labels.

6. A method as claimed in claim 5, characterized in that the step of calculating the probabilities P(Lj|Li) of confusing the adaptation labels Lj with the label Li comprises the steps of:

summing for each Lj the probabilities P(Li|Sk) for all states or transitions which corresponds to the adaptation label Lj to produce a count C(Lj,Li) for each Li and for each Lj;

summing for each Li the count C(Lj,Li) for all Lj to produce a divisor Di for each Li; and dividing for each Li and Lj the count C(Lj,Li) by the divisor Di to produce a quotient equal to P(Lj|Li) for each Lj.

7. A method as claimed in claim 6, characterized in that the step of calculating a revised conditional probability P(Lj|Sk) comprises the steps of multiplying P(Lj|Li) by P(Li|Sk) for each Li to produce products Qi, and then summing the products Qi to produce a total equal to P(Lj|Sk).

8. A speech recognition method comprising the steps of:

providing a set of Markov models, each Markov model corresponding to an element of speech information, each Markov model having states, transitions between states, probabilities of making transitions and probabilities of outputting labels at each of the transitions or states, said probabilities initially trained with a initial training label set;

converting an element of adaptation speech information into a string of adaptation labels using an adaptation label set different from the initial training label set;

identifying a corresponding Markov model from the set of Markov models which corresponds to the string of adaptation labels;

estimating for the corresponding Markov model an optimum string of states or transitions corresponding to the string of adaptation labels;

calculating a frequency of each of said adaptation labels corresponding to each of said states or transitions by said estimating;

calculating a probability of each of said initial training labels and each of said adaptation labels being confused with each other based on the frequency of the adaptation label concerned corresponding to each of said states or transitions and the probability of outputting the initial training label concerned at each of said states or transitions;

calculating a revised probability of outputting each of said adaptation labels at each of said states or transitions based on the confusion probabilities and the initial probabilities of outputting the initial training labels; and updating the corresponding Markov model by replacing the probabilities of outputting the initial training labels at each of said states or transitions with the revised probabilities of outputting the adaptation labels at each of said states or transitions.

9. A speech recognition method comprising the steps of:

providing a set of Markov models, each Markov model corresponding to an element of speech information, each Markov model having states, transitions between states, probabilities of making transitions, and probabilities of outputting initial labels from a set of initial labels at each of the transitions or states, each initial label representing a range of values of at least one measurable feature of a portion of an utterance;

changing the range of values represented by at least one label in the set of initial labels to produce a set of adaptation labels;

converting an element of adaptation speech information into a string of adaptation labels using the set of adaptation labels;

identifying a corresponding Markov model from the set of Markov models which corresponds to the string of adaptation labels;

estimating for the corresponding Markov model an optimum string of states and transitions corresponding to the string of adaptation labels;

calculating for each adaptation label Lj the probabilities P(Lj|Li) of confusing the adaptation label Lj with each initial label Li, said probabilities being calculated based on the initial conditional probabilities of the initial labels Li for each of the states or transitions corresponding to the adaptation label Lj;

calculating for each adaptation label Lj a revised conditional probability P(Lj|Sk) of occurrence of the adaptation label Lj for a first state or transition Sk based on the confusion probabilities P(Lj|Li) and based on the initial conditional probabilities P(Li|Sk) of the initial labels Li for the first state or transition; and updating the corresponding Markov model by replacing the initial conditional probabilities of the initial labels with the revised conditional probabilities of the adaptation labels.

10. A method as claimed in claim 9, characterized in that the step of calculating the probabilities P(Lj|Li) of confusing the adaptation labels Lj with the label Li comprises the steps of:

summing for each Lj the probabilities P(Li|Sk) for all states or transitions which corresponds to the adaptation label $L_j$ to produce a count $C(L_j,L_i)$ for each $L_i$ and for each $L_j$;

summing for each $L_i$ the count $C(L_j,L_i)$ for all $L_j$ to produce a divisor $D_i$ for each $L_i$; and dividing for each $L_i$ and $L_j$ the count $C(L_j,L_i)$ by the divisor $D_i$ to produce a quotient equal to $P(L_j|L_i)$ for each $L_j$.

11. A method as claimed in claim 10, characterized in that the step of calculating a revised conditional probability $P(L_j|S_k)$ comprises the steps of multiplying $P(L_j|L_i)$ by $P(L_i|S_k)$ for each $L_i$ to produce products $Q_i$, and then summing the products $Q_i$ to produce a total equal to $P(L_j|S_k)$.

* * * * *